(12) United States Patent
Kulkarni et al.

(10) Patent No.: US 10,215,070 B2
(45) Date of Patent: Feb. 26, 2019

(54) POWER GENERATION SYSTEM EXHAUST COOLING

(71) Applicant: General Electric Company, Schenectady, NY (US)

(72) Inventors: Parag Prakash Kulkarni, Niskayuna, NY (US); Lewis Berkley Davis, Jr., Niskayuna, NY (US); Robert Joseph Reed, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/753,073

(22) Filed: Jun. 29, 2015

(65) Prior Publication Data
US 2016/0376967 A1  Dec. 29, 2016

(51) Int. Cl.
*F01N 3/20* (2006.01)
*F02C 7/18* (2006.01)
(Continued)

(52) U.S. Cl.
CPC .......... *F01N 3/2046* (2013.01); *F01D 25/26* (2013.01); *F01D 25/305* (2013.01);
(Continued)

(58) Field of Classification Search
CPC ........ F01N 3/2046; F01N 3/2066; F02C 3/30; F02C 7/18
(Continued)

(56) References Cited

U.S. PATENT DOCUMENTS 2,627,927 A  2/1953 Mergen
3,677,012 A  7/1972 Batscha
(Continued)

FOREIGN PATENT DOCUMENTS

CH  679236 A5  1/1992
EP  1 643 113 A2  4/2006
(Continued)

OTHER PUBLICATIONS

Chupka, Marc; "Independent Evaluation of SCR Systems for Frame-Type Combustion Turbines"; The Brattle Group; Anthony Licata, Licata Energy & Environmental Consulting, Inc.; Report for ICAP Demand Curve Reset; Prepared for New York Independent System Operator, Inc.; Nov. 1, 2013; 42 Pages.
(Continued)

*Primary Examiner* — Christopher Demeree
(74) *Attorney, Agent, or Firm* — Ernest G. Cusick; Hoffman Warnick LLC (57) ABSTRACT

An airflow control system for a gas turbine system according to an embodiment includes: an airflow generation system for attachment to a rotatable shaft of a gas turbine system for drawing in an excess flow of air through an air intake section; a mixing area for receiving an exhaust gas stream produced by the gas turbine system; an air extraction system for extracting at least a portion of the excess flow of air generated by the airflow generation system to provide bypass air; an enclosure surrounding the gas turbine system and forming an air passage, the bypass air flowing through the air passage and around the gas turbine system into the mixing area to reduce a temperature of the exhaust gas stream; and an exhaust processing system for processing the reduced temperature exhaust gas stream.

10 Claims, 4 Drawing Sheets

(51) Int. Cl.
*F02C 3/30* (2006.01)
*F01D 25/26* (2006.01)
*F01D 25/30* (2006.01)
*F02C 7/20* (2006.01)

(52) U.S. Cl.
CPC .............. *F01N 3/2066* (2013.01); *F02C 3/30* (2013.01); *F02C 7/18* (2013.01); *F02C 7/20* (2013.01); *F01N 2270/02* (2013.01); *F05D 2260/606* (2013.01)

(58) Field of Classification Search
USPC .......................................................... 60/39.5
See application file for complete search history.

(56) References Cited

U.S. PATENT DOCUMENTS

| | | |
|---|---|---|
| 3,922,850 A | 12/1975 | McCabe |
| 3,968,647 A | 7/1976 | Boudigues |
| 3,998,047 A | 12/1976 | Walker |
| 4,064,692 A | 12/1977 | Johnson et al. |
| 4,068,471 A | 1/1978 | Simmons |
| 4,069,661 A * | 1/1978 | Rundell ................ F02K 3/075 60/204 |
| 4,085,583 A | 4/1978 | Klees |
| 4,131,432 A | 12/1978 | Sato et al. |
| 4,165,609 A | 8/1979 | Rudolph |
| 4,175,384 A | 11/1979 | Wagenknecht et al. |
| 4,183,210 A | 1/1980 | Snell |
| 4,222,233 A | 9/1980 | Johnson et al. |
| 4,292,008 A | 9/1981 | Grosjean et al. |
| 4,292,802 A * | 10/1981 | Snow ..................... F02K 3/075 60/204 |
| 4,555,902 A | 12/1985 | Pilarczyk |
| 4,813,229 A | 3/1989 | Simmons |
| 4,875,436 A | 10/1989 | Smith et al. |
| 4,892,269 A | 1/1990 | Greco et al. |
| 4,907,406 A | 3/1990 | Kirikami et al. |
| 4,961,312 A | 10/1990 | Simmons |
| 4,982,564 A | 1/1991 | Hines |
| 5,014,508 A | 5/1991 | Lifka |
| 5,113,649 A | 5/1992 | Siedlecki, Jr. |
| 5,255,505 A | 10/1993 | Cloyd et al. |
| 5,279,109 A | 1/1994 | Liu et al. |
| 5,473,898 A | 12/1995 | Briesch |
| 5,632,142 A | 5/1997 | Surette |
| 5,809,772 A | 9/1998 | Giffin, III et al. |
| 6,161,768 A | 12/2000 | Gordon et al. |
| 6,250,061 B1 * | 6/2001 | Orlando ................ F01D 9/065 60/772 |
| 6,543,234 B2 | 4/2003 | Anand et al. |
| 6,612,114 B1 * | 9/2003 | Klingels ............... F01D 5/187 415/115 |
| 6,786,034 B2 | 9/2004 | Liebig et al. |
| 6,798,079 B2 | 9/2004 | Nelson et al. |
| 7,493,769 B2 | 2/2009 | Jangili |
| 7,622,094 B2 | 11/2009 | Lewis et al. |
| 7,730,714 B2 | 6/2010 | Wood et al. |
| 7,966,825 B2 | 6/2011 | Judd |
| 8,015,826 B2 | 9/2011 | Myers et al. |
| 8,186,152 B2 | 5/2012 | Zhang et al. |
| 8,261,528 B2 | 9/2012 | Chillar et al. |
| 8,365,510 B2 | 2/2013 | Lugg |
| 8,549,833 B2 * | 10/2013 | Hyde ..................... F02C 6/00 60/204 |
| 2002/0124568 A1 | 9/2002 | Mikkelsen et al. |
| 2002/0129608 A1 | 9/2002 | Anand et al. |
| 2003/0182944 A1 | 10/2003 | Hoffman et al. |
| 2005/0150229 A1 | 7/2005 | Baer et al. |
| 2005/0235649 A1 | 10/2005 | Baer et al. |
| 2007/0101696 A1 | 5/2007 | Dooley |
| 2007/0130952 A1 | 6/2007 | Copen |
| 2007/0271929 A1 | 11/2007 | Berry |
| 2008/0116054 A1 | 5/2008 | Leach et al. |
| 2008/0253881 A1 | 10/2008 | Richards |
| 2010/0005806 A1 | 1/2010 | Donnelly |
| 2010/0024379 A1 | 2/2010 | Sengar et al. |
| 2010/0064655 A1 | 3/2010 | Zhang et al. |
| 2010/0107600 A1 | 5/2010 | Hillel et al. |
| 2010/0126182 A1 * | 5/2010 | Hoover ................ F01D 17/105 60/785 |
| 2010/0215558 A1 | 8/2010 | Kraemer |
| 2010/0247297 A1 | 9/2010 | Legare et al. |
| 2011/0030331 A1 | 2/2011 | Tong et al. |
| 2011/0036066 A1 | 2/2011 | Zhang et al. |
| 2011/0067385 A1 | 3/2011 | Hirata et al. |
| 2011/0138771 A1 | 6/2011 | Feller et al. |
| 2011/0158876 A1 | 6/2011 | Buzanowski et al. |
| 2012/0171020 A1 | 7/2012 | Peck et al. |
| 2013/0005237 A1 | 1/2013 | Baten et al. |
| 2013/0025254 A1 | 1/2013 | Kurosaka et al. |
| 2013/0031894 A1 | 2/2013 | Hodgson et al. |
| 2013/0331910 A1 | 2/2013 | Merchant et al. |
| 2013/0125557 A1 | 5/2013 | Scipio et al. |
| 2013/0318941 A1 | 12/2013 | Ekanayake et al. |
| 2013/0318965 A1 | 12/2013 | Ekanayake et al. |
| 2013/0318984 A1 | 12/2013 | Ekanayake et al. |
| 2013/0318987 A1 | 12/2013 | Ekanayake et al. |
| 2013/0318997 A1 | 12/2013 | Conchieri et al. |
| 2014/0090354 A1 | 4/2014 | Scipio et al. |
| 2014/0150447 A1 | 6/2014 | Ekanayake et al. |
| 2014/0165583 A1 | 6/2014 | Oliverio |
| 2014/0208765 A1 | 7/2014 | Ekanayake et al. |
| 2014/0230433 A1 | 8/2014 | Yacoub |
| 2014/0230444 A1 | 8/2014 | Hao et al. |
| 2014/0234073 A1 * | 8/2014 | Moreton ................ F01D 9/00 415/1 |
| 2014/0366547 A1 | 12/2014 | Kraft et al. |
| 2015/0047359 A1 * | 2/2015 | Maguire ............... F02C 7/12 60/726 |
| 2015/0089955 A1 | 4/2015 | Knapp et al. |
| 2015/0121842 A1 | 5/2015 | Moes |
| 2015/0143811 A1 | 5/2015 | Pang et al. |
| 2015/0252683 A1 | 9/2015 | Hasting et al. |
| 2016/0169119 A1 | 6/2016 | Musci et al. |
| 2016/0201605 A1 | 7/2016 | Brandstein et al. |
| 2016/0230658 A1 | 8/2016 | Hanlon et al. |
| 2016/0326878 A1 | 11/2016 | Morimoto et al. |
| 2016/0348560 A1 | 12/2016 | Sato et al. |
| 2016/0376908 A1 | 12/2016 | Reed et al. |
| 2016/0376909 A1 | 12/2016 | Kulkarni et al. |
| 2016/0376954 A1 | 12/2016 | Davis, Jr. et al. |
| 2016/0376955 A1 | 12/2016 | Reed et al. |
| 2016/0376956 A1 | 12/2016 | Kulkarni et al. |
| 2016/0376957 A1 | 12/2016 | Kulkarni et al. |
| 2016/0376958 A1 | 12/2016 | Davis, Jr. et al. |
| 2016/0376959 A1 | 12/2016 | Davis, Jr. et al. |
| 2016/0376960 A1 | 12/2016 | Reed et al. |
| 2016/0376961 A1 | 12/2016 | Kulkarni et al. |
| 2016/0376991 A1 | 12/2016 | Davis, Jr. et al. |
| 2016/0376992 A1 | 12/2016 | Davis, Jr. et al. |
| 2016/0376994 A1 | 12/2016 | Kulkarni et al. |
| 2017/0342911 A1 | 11/2017 | Kulkarni et al. |

FOREIGN PATENT DOCUMENTS

| | | |
|---|---|---|
| EP | 2 223 733 A1 | 9/2010 |
| EP | 2 615 265 A2 | 7/2013 |
| EP | 3 070 301 A1 | 9/2016 |
| GB | 774425 A | 5/1957 |
| JP | 2013124555 A | 6/2013 |
| WO | 2012/092215 A1 | 7/2012 |

OTHER PUBLICATIONS

Michael J. Reale, "New High Efficiency Simple Cycle Gas Turbine," General Electric Company, 2004, 20 pages. http://site.ge-energy.com/prod_serv/products/tech_docs/en/downloads/ger4222a.pdf.

U.S. Appl. No. 14/753,088, filed Jun. 29, 2015, Reed et al.

U.S. Appl. No. 14/753,064, filed Jun. 29, 2015, Davis et al.

(56) References Cited

OTHER PUBLICATIONS

U.S. Appl. No. 14/753,066, filed Jun. 29, 2015, Davis et al.
U.S. Appl. No. 14/753,072, filed Jun. 29, 2015, Davis et al.
U.S. Appl. No. 14/753,074, filed Jun. 29, 2015, Kulkarni et al.
U.S. Appl. No. 14/753,077, filed Jun. 29, 2015, Reed et al.
U.S. Appl. No. 14/753,080, filed Jun. 29, 2015, Kulkarni et al.
U.S. Appl. No. 14/753,085, filed Jun. 29, 2015, Kulkarni et al.
U.S. Appl. No. 14/753,093, filed Jun. 29, 2015, Kulkarni et al.
U.S. Appl. No. 14/753,102, filed Jun. 29, 2015, Davis et al.
U.S. Appl. No. 14/753,107, filed Jun. 29, 2015, Kulkarni et al.
U.S. Appl. No. 14/753,097, filed Jun. 29, 2015, Davis et al.
U.S. Appl. No. 14/753,105, filed Jun. 29, 2015, Reed et al.
U.S. Appl. No. 14/753,064, Office Action 1 dated Jan. 19, 2017, 24 pages.
U.S. Appl. No. 14/753,066, Office Action 1 dated Feb. 24, 2017, 33 pages.
U.S. Appl. No. 14/753,072, Office Action 1 dated Feb. 24, 2017, 34 pages.
U.S. Appl. No. 14/753,074, Office Action 1 dated Mar. 10, 2017, 41 pages.
Licata A., et al., "Viability of SCR on Simple Cycle Frame Gas Turbines," Licata Energy & Environmental Consultants, Inc., Yonkers, NY, Power Gen. 2014, Dec. 9-11, 2014, pp. 1-13.
"Turbofan," From Wikipedia, the free encyclopedia, Retrieved from the Internet URL: http://en.wikipedia.org/wiki/Turbofan, on Jan. 3, 2017, pp. 1-21.
Extended European Search Report and Opinion issued in connection with corresponding EP Application No. 16176400.6 dated Nov. 14, 2016.
Extended European Search Report and Opinion issued in connection with related EP Application No. 16176128.3 dated Nov. 15, 2016.
Extended European Search Report and Opinion issued in connection with related EP Application No. 16175821.4 dated Nov. 16, 2016.
Extended European Search Report and Opinion issued in connection with related EP Application No. 16175335.5 dated Nov. 25, 2016.
Extended European Search Report and Opinion issued in connection with related EP Application No. 16176515.1 dated Nov. 28, 2016.
Extended European Search Report and Opinion issued in connection with related EP Application No. 16176652.2 dated Nov. 28, 2016.
Extended European Search Report and Opinion issued in connection with related EP Application No. 16175556.6 dated Nov. 28, 2016.
Extended European Search Report and Opinion issued in connection with related EP Application No. 16176514.4 dated Dec. 2, 2016.
U.S. Appl. No. 14/753,093, Office Action 1 dated Jun. 1, 2017, 40 pages.
U.S. Appl. No. 14/753,064, Final Office Action 1 dated Jun. 2, 2017, 31 pages.
U.S. Appl. No. 14/753,097, Office Action 1 dated Oct. 11, 2017, 53 pages.
U.S. Appl. No. 14/753,077, Office Action 1 dated Oct. 13, 2017, 54 pages.
U.S. Appl. No. 14/753,107, Office Action 1 dated Oct. 20, 2017, 52 pages.
U.S. Appl. No. 14/753,085, Notice of Allowance dated Oct. 19, 2017, 17 pages.
U.S. Appl. No. 14/753,088, Final Office Action 1 dated Oct. 19, 2017, 2 pages.
U.S. Appl. No. 14/753,074, Notice of Allowance dated Sep. 18, 2017, 31 pages.
U.S. Appl. No. 14/753,064, Notice of Allowance dated Sep. 21, 2017, 10 pages.
U.S. Appl. No. 14/753,088, Office Action 1 dated Jun. 28, 2017, 37 pages.
U.S. Appl. No. 14/753,066, Notice of Allowance dated Jul. 13, 2017, 27 pages.
U.S. Appl. No. 14/753,072, Notice of Allowance dated Jul. 13, 2017, 28 pages.
U.S. Appl. No. 14/753,102, Office Action 1 dated Oct. 26, 2017, 53 pages.
U.S. Appl. No. 14/753,093, Final Office Action 1 dated Nov. 1, 2017, 30 pages.
U.S. Appl. No. 14/753,080, Notice of Allowance dated Nov. 3, 2017, 48 pages.
U.S. Appl. No. 14/753,077, Final Office Action dated Jan. 12, 2018, 26 pages.
U.S. Appl. No. 14/753,097, Final Office Action dated Jan. 29, 2018, 27 pages.
U.S. Appl. No. 14/753,102 Notice of Allowance dated Feb. 16, 2018, 21 pages.
U.S. Appl. No. 14/753,097, Notice of Allowance dated Feb. 22, 2018, 10 pages.
U.S. Appl. No. 14/753,107, Notice of Allowance dated Feb. 22, 2018, 21 pages.
U.S. Appl. No. 14/753,105, Office Action 1 dated Dec. 11, 2017, 67 pages.
U.S. Appl. No. 15/168,695, Office Action dated Aug. 9, 2018, 78 pages.
U.S. Appl. No. 14/753,105, Notice of Allowance dated Jun. 25, 2018, 12 pages.
U.S. Appl. No. 14/753,105, Final Office Action dated Apr. 6, 2018, 28 pages.
U.S. Appl. No. 14/753,093, Office Action dated Apr. 18, 2018, 38 pages.
U.S. Appl. No. 14/753,077, Notice of Allowance dated May 7, 2018, 14 pages.
U.S. Appl. No. 14/753,093, Final Office Action dated Nov. 28, 2018, 33 pages.

\* cited by examiner

POWER GENERATION SYSTEM EXHAUST COOLING

CROSS-REFERENCE TO RELATED APPLICATIONS

This application is related to co-pending U.S. application Ser. Nos. 14/753,064, 14/753,066, 14/753,072, 14/753,074, 14753,077, 14/753,080, 14/753,085, 14/753,088, 14/753,093, 14/753,102, 14/753,107, 14/753,097, and 14/753,105, all filed on Jun. 29, 2015.

BACKGROUND OF THE INVENTION

The disclosure relates generally to power generation systems, and more particularly, to systems and methods for cooling the exhaust gas of power generation systems.

Exhaust gas from power generation systems, for example a simple cycle gas turbine power generation system, often must meet stringent regulatory requirements for the composition of the exhaust gas released into the atmosphere. One of the components typically found in the exhaust gas of a gas turbine power generation system and subject to regulation is nitrogen oxide (i.e., $NO_x$), which includes, for example, nitric oxide and nitrogen dioxide. To remove $NO_x$ from the exhaust gas stream, technology such as selective catalytic reduction (SCR) is often utilized. In an SCR process, ammonia ($NH_3$) or the like reacts with the $NO_x$ and produces nitrogen ($N_2$) and water ($H_2O$).

The effectiveness of the SCR process depends in part on the temperature of the exhaust gas that is processed. The temperature of the exhaust gas from a gas turbine power generation system is often higher than about 1100° F. However, SCR catalysts need to operate at less than about 900° F. to maintain effectiveness over a reasonable catalyst lifespan. To this extent, the exhaust gas from a simple cycle gas turbine power generation system is typically cooled prior to SCR.

Large external blower systems have been used to reduce the exhaust gas temperature of a gas turbine power generation system below 900° F. by mixing a cooling gas, such as ambient air, with the exhaust gas. Because of the possibility of catalyst damage due to a failure of an external blower system, a redundant external blower system is typically utilized. These external blower systems include many components, such as blowers, motors, filters, air intake structures, and large ducts, which are expensive, bulky, and add to the operating cost of a gas turbine power generation system. Additionally, the external blower systems and the operation of the gas turbine power generation system are not inherently coupled, thus increasing the probability of SCR catalyst damage due to excess temperature during various modes of gas turbine operation. To prevent SCR catalyst damage due to excess temperature (e.g., if the external blower system(s) fail or cannot sufficiently cool the exhaust gas), the gas turbine may need to be shut down until the temperature issue can be rectified.

BRIEF DESCRIPTION OF THE INVENTION

A first aspect of the disclosure provides an airflow control system for a gas turbine system, including: an airflow generation system for attachment to a rotatable shaft of a gas turbine system for drawing in an excess flow of air through an air intake section; a mixing area for receiving an exhaust gas stream produced by the gas turbine system; an air extraction system for extracting at least a portion of the excess flow of air generated by the airflow generation system to provide bypass air; and an enclosure surrounding the gas turbine system and forming an air passage, the bypass air flowing through the air passage and around the gas turbine system into the mixing area to reduce a temperature of the exhaust gas stream.

A second aspect of the disclosure provides a turbomachine system, including: a gas turbine system including a compressor component, a combustor component, and a turbine component; a shaft driven by the turbine component; a fan coupled to the shaft upstream of the gas turbine system for drawing in an excess flow of air through an air intake section; a mixing area for receiving an exhaust gas stream produced by the gas turbine system; an air extraction system for extracting at least a portion of the excess flow of air generated by the fan to provide bypass air; an enclosure surrounding the gas turbine system and forming an air passage, the bypass air flowing through the air passage and around the gas turbine system into the mixing area to reduce a temperature of the exhaust gas stream; an airflow controller for controlling the air extraction system to maintain the reduced temperature exhaust gas stream at a temperature of less than about 900° F.; and a selective catalytic reduction (SCR) system for processing the reduced temperature exhaust gas stream.

A third aspect of the disclosure provides a power generation system, including: a gas turbine system including a compressor component, a combustor component, and a turbine component; a shaft driven by the turbine component; an electrical generator coupled to the shaft for generating electricity; a fan coupled to the shaft upstream of the gas turbine system for drawing in an excess flow of air through an air intake section; a mixing area for receiving an exhaust gas stream produced by the gas turbine system; an air extraction system for extracting at least a portion of the excess flow of air generated by the fan to provide bypass air; an enclosure surrounding the gas turbine system and forming an air passage, the bypass air flowing through the air passage and around the gas turbine system into the mixing area to reduce a temperature of the exhaust gas stream; an airflow controller for controlling the air extraction system to maintain the reduced temperature exhaust gas stream at a temperature of less than about 900° F.; and a selective catalytic reduction (SCR) system for processing the reduced temperature exhaust gas stream.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to power generation systems, and more particularly, to systems and methods for cooling the exhaust gas of power generation systems.

Figures 1, 2:
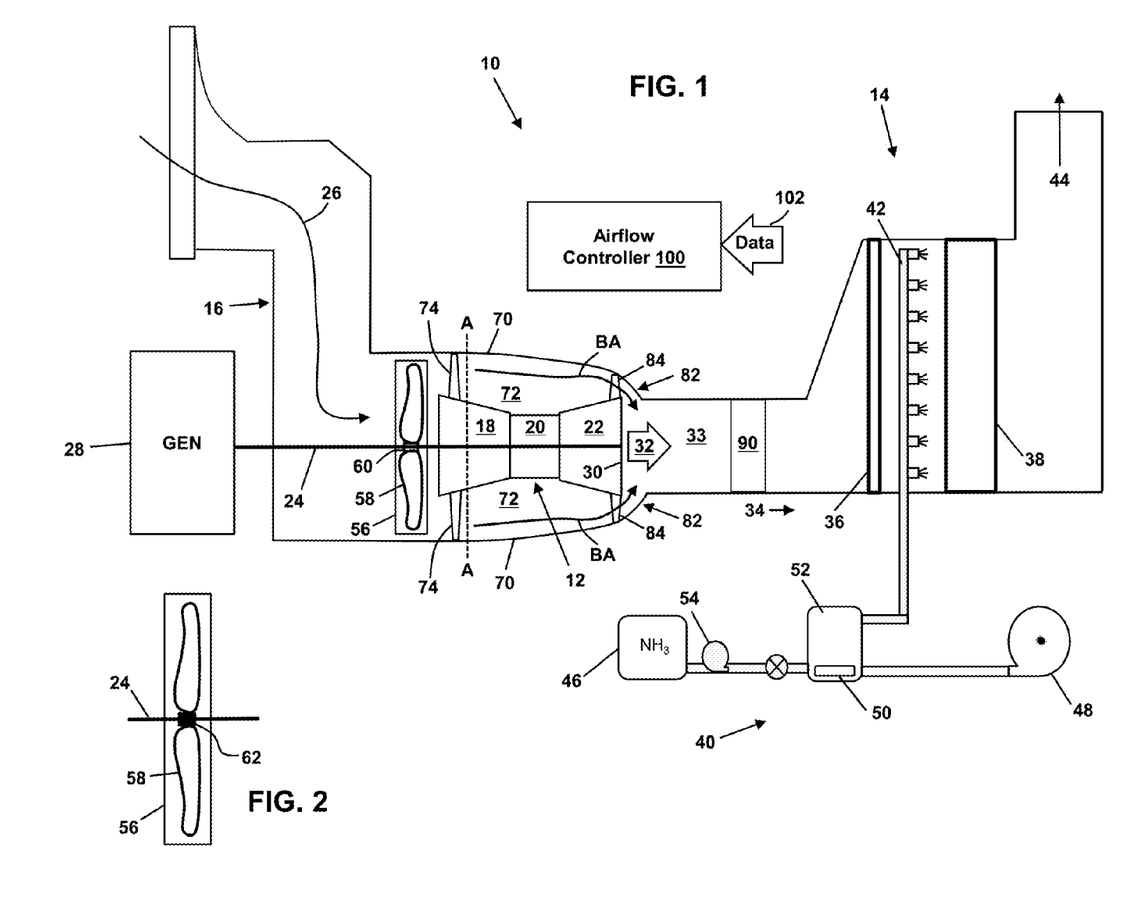
FIG. 1 shows a schematic diagram of a simple cycle gas turbine power generation system according to embodiments.
FIG. 2 depicts an airflow generation system according to embodiments.

FIG. 1 is a block diagram of a turbomachine (e.g., a simple cycle gas turbine power generation system 10) that includes a gas turbine system 12 and an exhaust processing system 14. The gas turbine system 12 may combust liquid or gas fuel, such as natural gas and/or a hydrogen-rich synthetic gas, to generate hot combustion gases to drive the gas turbine system 12.

The gas turbine system 12 includes an air intake section 16, a compressor component 18, a combustor component 20, and a turbine component 22. The turbine component 22 is drivingly coupled to the compressor component 18 via a shaft 24. In operation, air (e.g., ambient air) enters the gas turbine system 12 through the air intake section 16 (indicated by arrow 26) and is pressurized in the compressor component 18. The compressor component 18 includes at least one stage including a plurality of compressor blades coupled to the shaft 24. Rotation of the shaft 24 causes a corresponding rotation of the compressor blades, thereby drawing air into the compressor component 18 via the air intake section 16 and compressing the air prior to entry into the combustor component 20.

The combustor component 20 may include one or more combustors. In embodiments, a plurality of combustors are disposed in the combustor component 20 at multiple circumferential positions in a generally circular or annular configuration about the shaft 24. As compressed air exits the compressor component 18 and enters the combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through the turbine component 22 flow against and between the turbine blades, thereby driving the turbine blades and, thus, the shaft 24 into rotation. In the turbine component 22, the energy of the combustion gases is converted into work, some of which is used to drive the compressor component 18 through the rotating shaft 24, with the remainder available for useful work to drive a load such as, but not limited to, an electrical generator 28 for producing electricity, and/or another turbine.

The combustion gases that flow through the turbine component 22 exit the downstream end 30 of the turbine component 22 as a stream of exhaust gas 32. The exhaust gas stream 32 may continue to flow in a downstream direction 34 towards the exhaust processing system 14. The downstream end 30 of the turbine component 22 may be fluidly coupled via a mixing area 33 to a CO removal system (including, e.g., a CO catalyst 36) and an SCR system (including, e.g., an SCR catalyst 38) of the exhaust processing system 14. As discussed above, as a result of the combustion process, the exhaust gas stream 32 may include certain byproducts, such as nitrogen oxides ($NO_x$), sulfur oxides ($SO_x$), carbon oxides ($CO_x$), and unburned hydrocarbons. Due to certain regulatory requirements, an exhaust processing system 14 may be employed to reduce or substantially minimize the concentration of such byproducts prior to atmospheric release.

One technique for removing or reducing the amount of $NO_x$ in the exhaust gas stream 32 is by using a selective catalytic reduction (SCR) process. For example, in an SCR process for removing $NO_x$ from the exhaust gas stream 32, ammonia ($NH_3$) or other suitable reductant may be injected into the exhaust gas stream 32. The ammonia reacts with the $NO_x$ to produce nitrogen ($N_2$) and water ($H_2O$).

As shown in FIG. 1, an ammonia evaporator system 40 and an ammonia injection grid 42 may be used to vaporize and inject an ammonia solution (e.g., stored in a tank 46) into the exhaust gas stream 32 upstream of the SCR catalyst 38. The ammonia injection grid 42 may include, for example, a network of pipes with openings/nozzles for injecting vaporized ammonia into the exhaust gas stream 32. As will be appreciated, the ammonia and $NO_x$ in the exhaust gas stream 32 react as they pass through the SCR catalyst 38 to produce nitrogen ($N_2$) and water ($H_2O$), thus removing $NO_x$ from the exhaust gas stream 32. The resulting emissions may be released into the atmosphere through a stack 44 of the gas turbine system 12.

The ammonia evaporator system 40 may further include, for example, a blower system 48, one or more heaters 50 (e.g., electric heaters), and an ammonia vaporizer 52, for providing vaporized ammonia that is injected into the exhaust gas stream 32 via the ammonia injection grid 42. The ammonia may be pumped from the tank 46 to the ammonia vaporizer 52 using a pump system 54. The blower system 48 may include redundant blowers, while the pump system 54 may include redundant pumps to ensure continued operation of the ammonia evaporator system 40 in case of individual blower/pump failure.

The effectiveness of the SCR process depends in part on the temperature of the exhaust gas stream 32 that is processed. The temperature of the exhaust gas stream 32 generated by the gas turbine system 12 is often higher than about 1100° F. However, the SCR catalyst 38 typically needs to operate at temperatures less than about 900° F.

According to embodiments, an airflow generation system 56 may be used to provide cooling air for lowering the temperature of the exhaust gas stream 32 to a level suitable for the SCR catalyst 38. As depicted in FIG. 1, the airflow generation system 56 may include a fan 58. The fan 58 may be coupled to the shaft 24 of the gas turbine system 12 upstream of the gas turbine system 12 to provide cooling air (e.g., ambient air) drawn in through the air intake section 16 that may be used to lower the temperature of the exhaust gas stream 32. The fan 58 may be fixedly mounted (e.g. bolted, welded, etc.) to the shaft 24 of the gas turbine system 12 using a mounting system 60. To this extent, the fan 58 is configured to rotate at the same rotational speed as the shaft 24. In other embodiments, as shown in FIG. 2, a clutch mechanism 62 may used to releasably couple the fan 58 to the shaft 24 of the gas turbine system 12. This allows the fan 58 to be selectively decoupled from the shaft 24 if not needed. When the clutch mechanism 62 is engaged, the fan 58 is coupled to the shaft 24 and is configured to rotate at the same rotational speed as the shaft 24. Clutch coupling/decoupling commands may be provided to the clutch mechanism 62 via an airflow controller 100 (FIG. 1). An adjustable speed drive system may also be used to couple the fan 58 to the shaft 24 to allow the fan 58 to be rotated at a different speed than the shaft 24.

The compressor component 18 has a flow rate capacity and is configured to draw in a flow of air (e.g., ambient air) via the air intake section 16 based on its flow rate capacity. In operation, the fan 58 is designed to draw in an additional flow of air through the air intake section 16 that is about 10% to about 40% of the flow rate capacity of the compressor component 18. In general, the percentage increase in the flow of air may be varied and selectively controlled based on several factors including the load on the gas turbine system 12, the temperature of the air being drawn into the gas turbine system 12, the temperature of the exhaust gas stream 32 at the SCR catalyst 38, etc.

Figure 3:
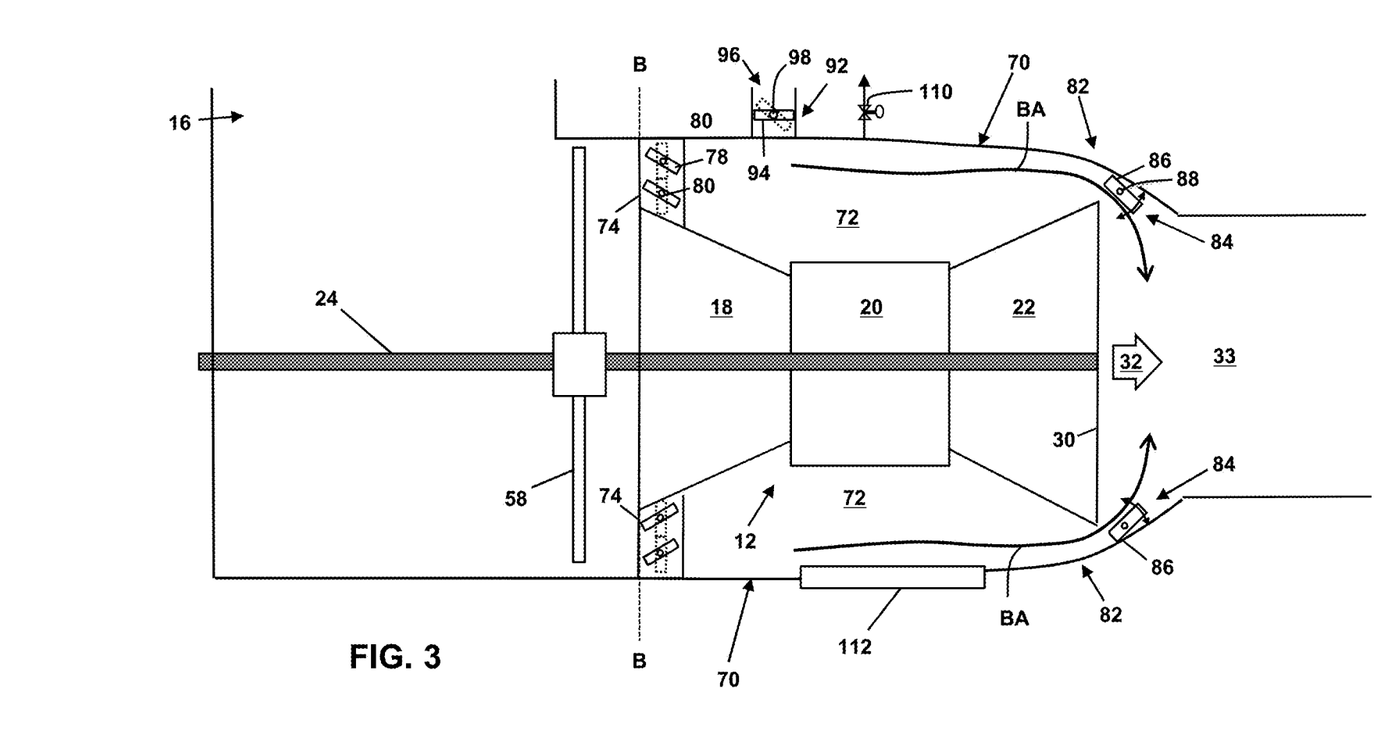
FIG. 3 depicts an enlarged view of a portion of the gas turbine power generation system of FIG. 1 according to embodiments.
Figure 4:
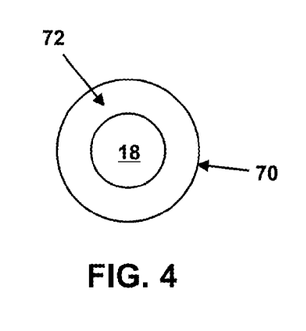
FIG. 4 is an illustrative cross-sectional view of the bypass enclosure and the compressor component of the gas turbine system taken along line A-A of FIG. 1.

As depicted in FIGS. 1 and 3, the gas turbine system 12 may be surrounded by a bypass enclosure 70. The bypass enclosure 70 extends from, and fluidly couples, the air intake section 16 to the mixing area 33. The bypass enclosure 70 may have any suitable configuration. For instance, the bypass enclosure 70 may have an annular configuration as depicted in FIG. 4, which is a cross-section taken along line A-A in FIG. 1. The bypass enclosure 70 forms an air passage 72 around the gas turbine system 12 through which a supply of cooling bypass air (BA) may be provided for cooling the exhaust gas stream 32 of the gas turbine system 12.

Figure 5:
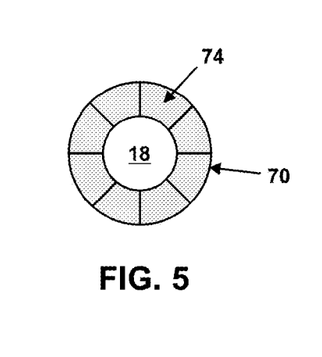
FIG. 5 is an illustrative cross-sectional view of the bypass enclosure and the compressor component of the gas turbine system taken along line B-B of FIG. 3.

An air extraction system 74 may be provided to extract at least some of the additional flow of air provided by the fan 58 (e.g., any airflow greater than the flow rate capacity of the compressor component 18 of the gas turbine system 12) and to direct the extracted air into the air passage 72 formed between the bypass enclosure 70 and the gas turbine system 12. The air extraction system 74 may comprise, for example, inlet guide vanes, a stator, or any other suitable system for selectively directing a flow of air into the air passage 72. In the following description, the air extraction system 74 comprises, but is not limited to, inlet guide vanes. As shown in FIG. 5, which is a cross-section taken along line B-B in FIG. 3, the air extraction system 74 may extend completely around the entrance to the air passage 72 formed between the bypass enclosure 70 and the compressor component 18 of the gas turbine system 12.

As depicted in FIG. 3, the air extraction system 74 may include a plurality of inlet guide vanes 78 for controlling the amount of air directed into the air passage 72 formed between the bypass enclosure 70 and the gas turbine system 12. Each inlet guide vane 78 may be selectively controlled (e.g., rotated) by an independent actuator 80. Actuators 80 according to various embodiments are shown schematically in FIG. 3, but any known actuator may be utilized. For example, the actuators 80 may comprise an electro-mechanical motor, or any other type of suitable actuator.

The bypass air does not enter the gas turbine system 12, but is instead directed to the mixing area 33 through the air passage 72 as indicated by arrows BA, where the bypass air may be used to cool the exhaust gas stream 32. The remaining air (i.e., any portion of the additional flow of air not extracted via the air extraction system 74) enters the compressor component 18 of the gas turbine system 12 and flows through the gas turbine system 12 in a normal fashion. If the flow of remaining air is greater than the flow rate capacity of the compressor component 18 of the gas turbine system 12, a supercharging of the gas turbine system 12 may occur, increasing the efficiency and power output of the gas turbine system 12.

The actuators 80 of the air extraction system 74 may be independently and/or collectively controlled in response to commands from the airflow controller 100 to selectively vary the positioning of the inlet guide vanes 78. That is, the inlet guide vanes 78 may be selectively rotated about a pivot axis by the actuators 80. In embodiments, each inlet guide vane 78 may be individually pivoted independently of any other inlet guide vane 78. In other embodiments, groups of inlet guide vanes 78 may be pivoted independently of other groups of inlet guide vanes 78 (i.e., pivoted in groups of two or more such that every inlet guide vane 78 in a group rotates together the same amount). Position information (e.g., as sensed by electro-mechanical sensors or the like) for each of the inlet guide vanes 78 may be provided to the airflow controller 100.

The increased flow of air provided by the fan 58 may increase the air pressure at the compressor component 18. For example, in the case where the flow of air is increased from about 10% to about 40% by the operation of the fan 58, a corresponding pressure increase of about 5 to about 15 inches of water may be achieved. This pressure increase may be used to overcome pressure drop and facilitate proper mixing (described below) of cooler air with the exhaust gas stream 32 in the downstream exhaust processing system 14. The pressure increase may also be used to supercharge the gas turbine system 12.

The bypass air flows toward and into the mixing area 33 downstream of the turbine component 22 through the air passage 72. In embodiments, the bypass air exits the air passage 72 and is directed at an angle toward and into the exhaust gas stream 32 in the mixing area 33 to enhance mixing. In the mixing area 33, the bypass air (e.g., ambient air) mixes with and cools the exhaust gas stream 32 to a temperature suitable for use with the SCR catalyst 38. In embodiments, the temperature of the exhaust gas stream 32 generated by the gas turbine system 12 is cooled by the bypass air from about 1100° F. to less than about 900° F. in the mixing area 33.

As depicted in FIGS. 1 and 3, the distal end 82 of the bypass enclosure 70 may curve inwardly toward the mixing area 33 to direct the bypass air at an angle toward and into the exhaust gas stream 32 in the mixing area 33. The intersecting flows of the bypass air and the exhaust gas stream 32 may facilitate mixing, thereby enhancing the cooling of the exhaust gas stream 32. A flow directing system 84 may also be provided to direct the bypass air at an angle toward and into the exhaust gas stream 32. Such a flow directing system 84 may include, for example, outlet guide vanes, stators, nozzles, or any other suitable system for selectively directing the flow of bypass air into the mixing area 33.

An illustrative flow directing system 84 is shown in FIG. 3. In this example, the flow directing system 84 includes a plurality of outlet guide vanes 86. Each outlet guide vane 86 may be selectively controlled (e.g., rotated) by an independent actuator 88. The actuators 88 are shown schematically in FIG. 3, but any known actuator may be utilized. For example, the actuators 88 may comprise an electro-mechanical motor, or any other type of suitable actuator. In embodiments, the flow directing system 84 may extend completely around the exit of the air passage 72 formed between the bypass enclosure 70 and the turbine component 18 of the gas turbine system 12.

A supplemental mixing system 90 (FIG. 1) may be positioned within the mixing area 33 to enhance the mixing process. The supplemental mixing system 90 may comprise, for example, a static mixer, baffles, and/or the like. The CO catalyst 36 may also help to improve the mixing process by adding back pressure (e.g., directed back toward the turbine component 22).

As shown in FIG. 3, bypass air may be selectively released from the bypass enclosure 70 using an air release system 92 comprising, for example, one or more dampers 94 (or other devices capable of selectively restricting airflow, e.g. guide vanes) located in one or more air outlets 96. The position of a damper 94 within an air outlet 96 may be selectively controlled (e.g., rotated) by an independent actuator 98. The actuator 98 may comprise an electro-mechanical motor, or any other type of suitable actuator. Each damper 94 may be controlled in response to commands from the airflow controller 100 to selectively vary the positioning of the damper 94 such that a desired amount of bypass air may be released from the bypass enclosure 70. Position information (e.g., as sensed by electro-mechanical sensors or the like) for each damper 94 may be provided to the airflow controller 100. Further airflow control may be provided by releasing bypass air from the bypass enclosure 70 through one or more metering valves 110 (FIG. 3) controlled via commands from the airflow controller 100.

Figure 6:
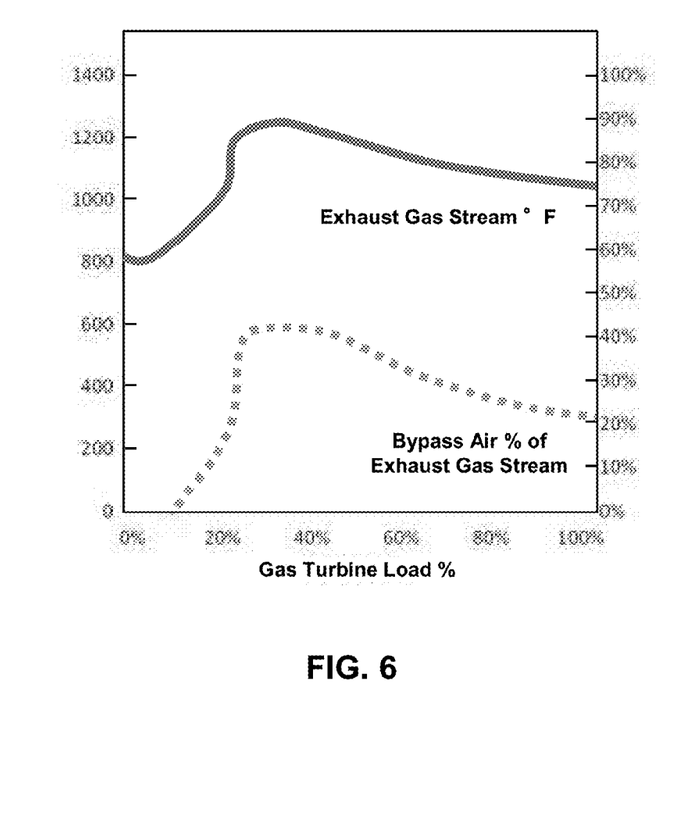
FIG. 6 is a chart showing an illustrative relationship between the flow of bypass air into a mixing area and the temperature of the exhaust gas stream at different load percentages of a gas turbine system, according to embodiments.

The airflow controller 100 may be used to regulate the amount of air generated by the fan 58 that is diverted as bypass air into the mixing area 33 through the air passage 72 relative to the amount of air that enters the gas turbine system 12 (and exits as the exhaust gas stream 32) in order to maintain a suitable temperature at the SCR catalyst 38 under varying operating conditions. A chart showing an illustrative relationship between the flow of bypass air into the mixing area 33 and the temperature of the exhaust gas stream 32 at different load percentages of the gas turbine system 12 is provided in FIG. 6. In this example, the chart in FIG. 6 depicts: 1) temperature variation of an exhaust gas stream 32 of a gas turbine system 12 at different load percentages of the gas turbine system 12; and 2) corresponding variation in the flow of bypass air as a percentage of the exhaust gas stream 32 (bypass ratio) needed to maintain the temperature at the SCR catalyst 38 at a suitable level (e.g., 900° F.) at different load percentages of the gas turbine system 12. As represented in the chart in FIG. 6, the amount of bypass air flowing through the air passage 72 into the mixing area 33 may be varied (e.g., under control of the airflow controller 100) as the temperature of the exhaust gas stream 32 changes, in order to regulate the temperature at the SCR catalyst 38.

The airflow controller 100 (FIG. 1) may receive data 102 associated with the operation of the gas turbine power generation system 10. Such data may include, for example, the temperature of the exhaust gas stream 32 as it enters the mixing area 33, the temperature of the exhaust gas stream 32 at the SCR catalyst 38 after mixing/cooling has occurred in the mixing area 33, the temperature of the air drawn into the air intake section 16 by the combined action of the fan 58 and the compressor component 18 of the gas turbine system 12, and other temperature data obtained at various locations within the gas turbine power system 10. The data 102 may further include airflow and pressure data obtained, for example, within the air intake section 16, at the air extraction system 74, at the fan 58, at the entrance of the compressor component 18, within the air passage 72, at the downstream end 30 of the turbine component 22, at the flow directing system 84, and at various other locations within the gas turbine power generation system 10. Load data, fuel consumption data, and other information associated with the operation of the gas turbine system 12 may also be provided to the airflow controller 100. The airflow controller 100 may further receive positional information associated with the inlet guide vanes 78, outlet guide vanes 86, damper 94, valve 110, etc. It should be readily apparent to those skilled in the art how such data may be obtained (e.g., using appropriate sensors, feedback data, etc.), and further details regarding the obtaining of such data will not be provided herein.

Based on the received data 102, the airflow controller 100 (FIG. 1) is configured to vary as needed the amount of bypass air flowing through the air passage 72 into the mixing area 33 to maintain the temperature at the SCR catalyst 38 at a suitable level. This may be achieved, for example, by varying at least one of: the flow of air drawn into the air intake section 16 by the combined action of the fan 58 and the compressor component 18 of the gas turbine system 12; the flow of air 72 allowed into the air passage 72 via the air extraction system 74 (this flow may be controlled, for example, by adjusting the position of one or more of the inlet guide vanes 78); and the flow of bypass air passing through the air passage 72 into the mixing area 33 (this flow may be controlled, for example, by adjusting the position of one or more of the dampers 94 and/or the operational status of the metering valves 110).

The airflow controller 100 may include a computer system having at least one processor that executes program code configured to control the amount of bypass air flowing through the air passage 72 into the mixing area 33 using, for example, data 102 and/or instructions from human operators. The commands generated by the airflow controller 100 may be used to control the operation of various components (e.g., such as actuators 80, 88, 98, clutch 62, valve 110, and/or the like) in the gas turbine power generation system 10. For example, the commands generated by the airflow controller 100 may be used to control the operation of the actuators 80, 88, and 98 to control the rotational position of the inlet guide vanes 78, outlet guide vanes 86, and dampers 94, respectively. Commands generated by the airflow controller 100 may also be used to activate other control settings in the gas turbine power generation system 10.

As shown schematically in FIG. 3, the bypass enclosure 70 may be provided with one or more access doors 112. The access doors 112 provide access through the bypass enclosure 70 to the various components of the gas turbine system 12 (e.g., for servicing, repair, etc.).

Figure 7:
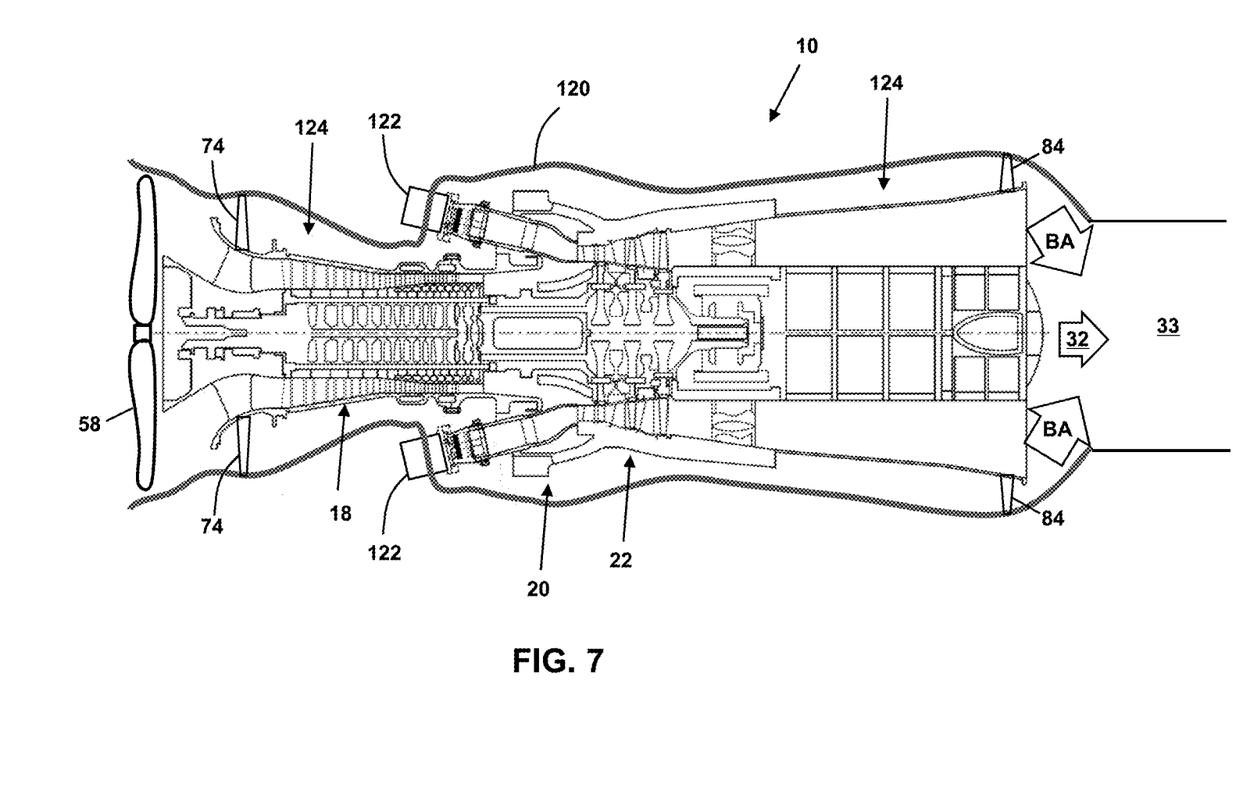
FIG. 7 shows a schematic diagram of a simple cycle gas turbine power generation system according to embodiments.

In other embodiments, as depicted in FIG. 7, the gas turbine casing 120 itself can be used in lieu of the enclosure 70. This configuration operates similarly to the system depicted in FIG. 1, except that the air extraction system 74 and flow directing system 84 are disposed within the gas turbine casing 120. The fuel/combustor inlets 122 of the combustor component 20 of the gas turbine system 10 may extend through the gas turbine casing 120 (e.g., for easier access). In this configuration, bypass air (BA) passes between the gas turbine casing 120 and the exterior of the compressor component 18, combustor component 20, and turbine component 22. Other components depicted in FIGS.

1 and 3, such as the air intake section, exhaust processing system, airflow controller, etc. are not shown for sake of clarity in FIG. 7.

In operation, with continuing references to FIG. 7, a portion of the air drawn in by the fan 58 and the compressor component 18 is directed as bypass air into an air passage 124 formed between the gas turbine casing 120 and the exterior of the compressor component 18, combustor component 20, and turbine component 22 by the air extraction system 74. The bypass air exits the air passage 124 and is directed by at an angle by the flow directing system 84 toward and into the exhaust gas stream 32 in the mixing area 33. In the mixing area 33, the bypass air (e.g., ambient air) mixes with and cools the exhaust gas stream 32 to a temperature suitable for use with the SCR catalyst 38 (FIG. 1). The temperature of the exhaust gas stream 32 generated by the gas turbine system 12 is cooled by the bypass air from about 1100° F. to less than about 900° F. in the mixing area 33.

The use of an airflow generation system 56 including a fan 58 in lieu of conventional large external blower systems and/or other conventional cooling structures provides many advantages. For example, the need for redundant external blower systems and associated components (e.g., blowers, motors and associated air intake structures, ducts, filters, etc.) is eliminated. This reduces manufacturing and operating costs, as well as the overall footprint, of the gas turbine power generation system 10. The footprint is further reduced as the fan 58 draws in air through an existing air intake section 16, rather than through separate, dedicated intake structures often used with external blower systems.

Use of the fan 58 provides a more reliable and efficient gas turbine power generation system 10. For example, since the bypass air used for cooling in the mixing area 33 is driven by the shaft 24 of the gas turbine system 12 itself, large external blower systems are no longer required. Further, at least a portion of the additional flow of air generated by the fan 58 may be used to supercharge the gas turbine system 12.

Power requirements of the gas turbine power generation system 10 are reduced because the fan 58 is coupled to, and driven by, the shaft 24 of the gas turbine system 12. This configuration eliminates the need for large blower motors commonly used in conventional external blower cooling systems.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airflow control system for a gas turbine system, comprising:
    an airflow generation system for attachment to a rotatable shaft of a gas turbine system for drawing in an excess flow of air through an air intake section;
    a mixing area for receiving an exhaust gas stream produced by a turbine component of the gas turbine system;
    an air extraction system for extracting at least a portion of the excess flow of air generated by the airflow generation system to provide bypass air for controlling the temperature of the exhaust gas stream in the mixing area, the air extraction system including:
        an enclosure surrounding the gas turbine system and forming an annular and circumferential bypass air passage for diverting the bypass air completely around a compressor component, a combustor component, and the turbine component of the gas turbine system into the mixing area downstream of the turbine component to reduce a temperature of the exhaust gas stream produced by the turbine component of the gas turbine system, the bypass air passage having an annular and circumferential entrance disposed between an exterior of the compressor component and an interior surface of the enclosure;
        a guide vane assembly, extending completely around the entrance of the bypass air passage between the exterior of the compressor component and the interior surface of the enclosure, for controlling the temperature of the exhaust gas stream in the mixing area by controlling the flow of bypass air entering the bypass air passage, wherein the guide vane assembly is disposed downstream from the airflow generation system; and
        an air release system for controlling the temperature of the exhaust gas stream in the mixing area by selectively releasing a portion of the bypass air from the bypass air passage to an exterior of the enclosure.

2. The airflow control system of claim 1, wherein the airflow generation system comprises a fan.

3. The airflow control system of claim 1, further comprising a mixing system for mixing the bypass air with the exhaust gas stream in the mixing area.

4. The airflow control system of claim 1, further comprising a flow directing system for directing the bypass air from an exit of the enclosure toward and into the exhaust gas stream in the mixing area.

5. The airflow control system of claim 4, wherein the flow directing system comprises an inwardly curved end portion of the enclosure and/or at least one outlet guide vane.

6. The airflow control system of claim 1, wherein the excess flow of air drawn in by the airflow generation system is distinct from, and comprises 10 percent to 40 percent of, a flow of air drawn in by the compressor component of the gas turbine system.

7. The airflow control system of claim 1, wherein the air extraction system is configured to divert any non-extracted portion of the excess flow of air into the compressor component of the gas turbine system to supercharge the gas turbine system.

8. The airflow control system of claim 1, further comprising a selective catalytic reduction (SCR) system for processing the reduced temperature exhaust gas stream from the mixing area.

9. The airflow control system of claim 1, wherein the enclosure comprises a casing of the gas turbine system.

10. The airflow control system of claim 1, further comprising an airflow controller for controlling the air extraction system to maintain the reduced temperature exhaust gas stream at a temperature of less than 900° F.

* * * * *